(12) United States Patent
Beck

(10) Patent No.: US 6,682,325 B1
(45) Date of Patent: Jan. 27, 2004

(54) HYDRAULIC UNIT

(75) Inventor: Erhard Beck, Weilburg (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 31 days.

(21) Appl. No.: 10/148,504

(22) PCT Filed: Nov. 24, 2000

(86) PCT No.: PCT/EP00/11701

§ 371 (c)(1),
(2), (4) Date: May 31, 2002

(87) PCT Pub. No.: WO01/40042

PCT Pub. Date: Jun. 7, 2001

(30) Foreign Application Priority Data

Dec. 1, 1999 (DE) .......................................... 199 57 923
May 31, 2000 (DE) .......................................... 100 27 172

(51) Int. Cl.$^7$ .................................................. F04B 23/00
(52) U.S. Cl. ............................................................ 417/440
(58) Field of Search .................................. 417/440, 434, 417/435, 415

(56) References Cited

U.S. PATENT DOCUMENTS

| | | | |
|---|---|---|---|
| 1,043,669 A | * | 11/1912 | Chauvin et al. ............... 73/198 |
| 4,522,170 A | * | 6/1985 | Lenk et al. ............ 123/198 DC |
| 6,113,364 A | * | 9/2000 | Haecker et al. ............. 417/434 |
| 2001/0045192 A1 | * | 11/2001 | Nemoto et al. ........... 123/65 A |

FOREIGN PATENT DOCUMENTS

| | | |
|---|---|---|
| DE | 4438163 | 5/1996 |
| DE | 19648319 | 1/1998 |
| DE | 19643289 | 4/1998 |
| DE | 19712209 | 10/1998 |
| DE | 19851762 | 1/2000 |
| WO | 00/03902 | 1/2000 |

OTHER PUBLICATIONS

Search Report of the German Patent Office for Appln 10027172.3.

* cited by examiner

Primary Examiner—Charles G. Freay
(74) Attorney, Agent, or Firm—Rader, Fishman & Grauer PLLC

(57) ABSTRACT

The present invention relates to a hydraulic unit, in particular for slip-controlled automotive vehicle brake systems, including a pump and an electric motor for driving the pump, wherein the drive of the electric motor extends into a crank chamber of the pump, and including ventilation and venting of the crank chamber for the purpose of pressure compensation in relation to the atmosphere using a pressure compensation channel. The pressure compensation channel is connectable to the atmosphere by way of inlet and outlet valves which are closed in their basic position and responsive to the pressure differential.

7 Claims, 2 Drawing Sheets

HYDRAULIC UNIT

TECHNICAL FIELD

The present invention generally relates to a hydraulic unit and more particularly relates to a hydraulic control unit used for vehicle brake control.

BACKGROUND OF THE INVENTION

DE 44 38 163 A1 discloses a hydraulic unit used in vehicle brake applications. Special provisions are necessary for arranging this hydraulic unit in an automotive vehicle in order to comply with specifications with respect to the operability of the system, e.g. a salt spray test, and hence to satisfy the later everyday demands placed on the resistance to salt water and splash water during operation.

A joint ventilation system ensures that the ventilation and venting of the hollow chambers in the hydraulic unit for the purpose of pressure compensation relative to the atmosphere takes place exclusively by way of one single point of ventilation which is in connection to a pressure compensation channel of the ventilation system. This point of ventilation includes a wall portion which is permeable to gas, but impermeable to fluid and solid particles.

Alternatively, the point of ventilation may be provided with a non-return valve which protects the hollow chambers against the ingress of moisture.

The fluid-impermeable wall portion prevents, however, the discharge of leakage fluid of the pump which initially collects in the crank chamber of the pump and can dam up towards the electric motor and, hence, in the present embodiment, also in the direction of the other function elements of the hydraulic unit which are connected by way of the ventilation system so that already small quantities of leakage fluid in the electric motor may cause malfunctions of the hydraulic unit.

In view of the above, an object of the present invention is to improve upon a hydraulic unit of the type referred to hereinabove so that leakage fluid of the pump can be discharged reliably out of the crank chamber into the open air without inhibiting the exchange of air and, thus, ventilation of the hydraulic unit.

DETAILED DESCRIPTION OF THE PREFERRED EMBODIMENTS

Figure 1:
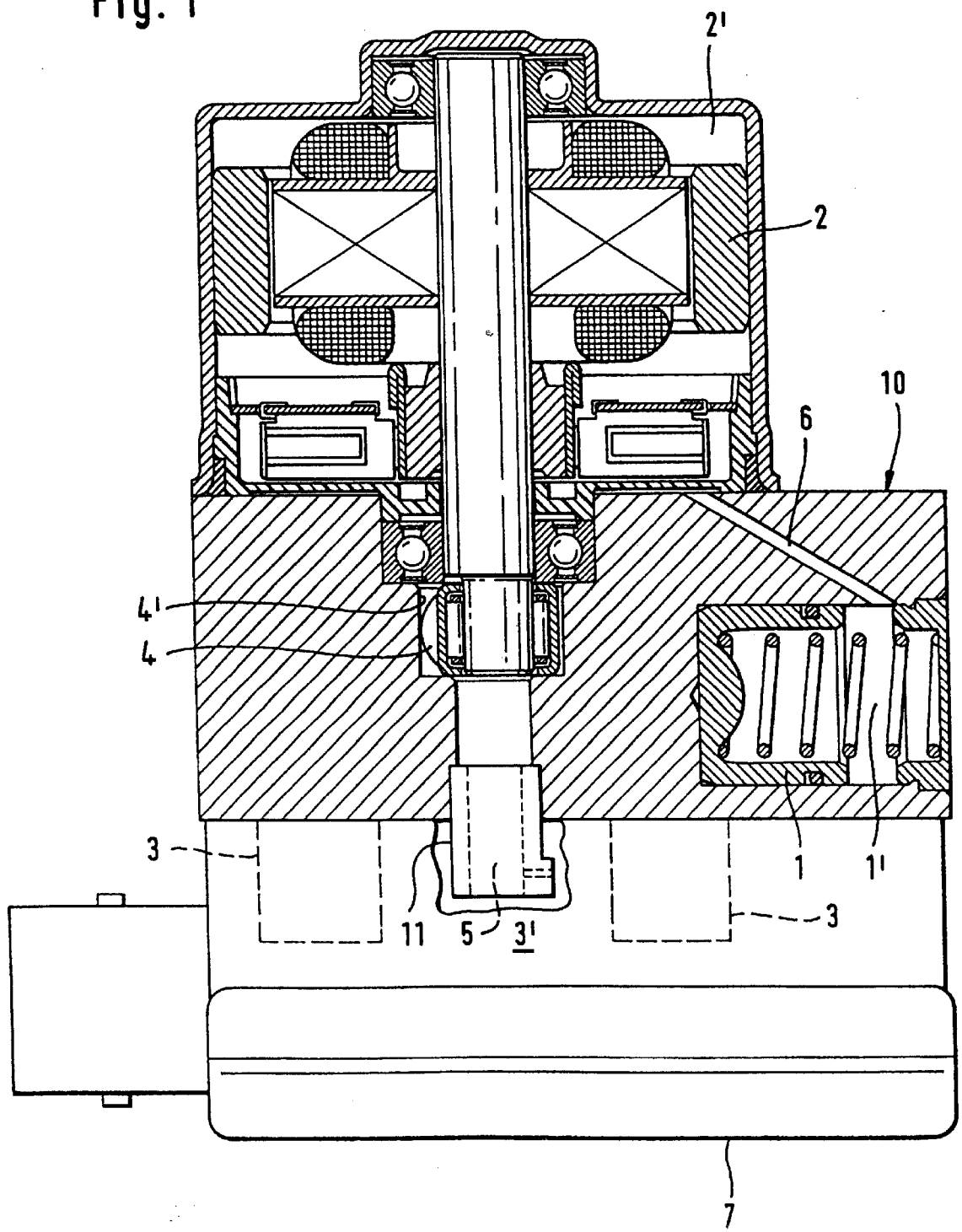
FIG. 1 is an embodiment of a hydraulic unit with a pressure compensation channel interposed between the accommodating member and a cover unit.

FIG. 1 shows a hydraulic unit with an accommodating member 10, shown in cross-section, for the arrangement of an electric motor 2, a plurality of valve elements 3, and an accumulator element 1. The electric motor 2 is designed as a d-c motor having a rotor which is mounted on a shaft end in a bowl-shaped housing and having another bearing that is guided in a blind-end bore of the accommodating member 10. This bearing guides the shaft of the electric motor 2 in the vicinity of the shaft eccentric pin which reaches into a so-called crank chamber 4' and includes a needle bearing for actuating a pump 4 equipped with radial pistons. Another bore portion of smaller diameter is adjacent to the bearing of the electric motor 2 in the accommodating member 10. This bore portion follows the pressure compensation channel 5 in the direction of the surface of the accommodating member 10. On this end surface of the accommodating member 10, there is a cover unit 7 which encloses the valve elements 3 in a breathable manner. The hollow chamber 3' may be subdivided to accommodate electric or electronic components. The accumulator element 1 is movably aligned in the accommodating member 10 in a transverse position to the electric motor 2. The hollow chamber 1' that is arranged between the piston-shaped accumulator element 1 and the closure cover is connected to the hollow chamber 2' of the electric motor 2 by way of a pressure compensation channel 6, for example. To this end, the brush plate of the drive element 2 includes corresponding apertures which establish an open connection between the hollow chamber 1' and the hollow chamber 2', with the hollow chamber 2' of the electric motor 2 having a pressure-compensating connecting path in the direction of the crank chamber 4' preferably by way of the clearance fit of the brush plate on the drive shaft and the distances between the bearing balls. Following this connecting path is the initially mentioned pressure compensation channel 5 as only central point of ventilation. This achieves an open point which connects the hollow chambers in the hydraulic unit to the atmosphere exclusively by way of the point of ventilation existing between the accommodating member 10 and the cover unit 7, the said open point permitting the reliable outflow of leakage fluid of pump 4 out of the crank chamber 4' into the cover unit 7 in order to prevent contamination of the electric motor 2 in any case.

Possible pressure variations in the operation of the hydraulic unit which make the hollow chamber 1' act as expansion and compression chamber, especially due to the movement of the accumulator element 1, are thus transmitted exclusively within a closed ventilation circuit, and the currents of ventilation in the hollow chamber 2' which are generated by rotation are subject to the pressure variations of the accumulator element 1. Likewise, the air current which is caused by rotation of the electric motor 2 is of minor importance due to its continuous course so that ventilation and venting and, hence, the ventilation in the hydraulic unit is generally determined by the discontinuous mode of operation of the accumulator element 1 and the piston oscillation of pump 4.

Figure 2:
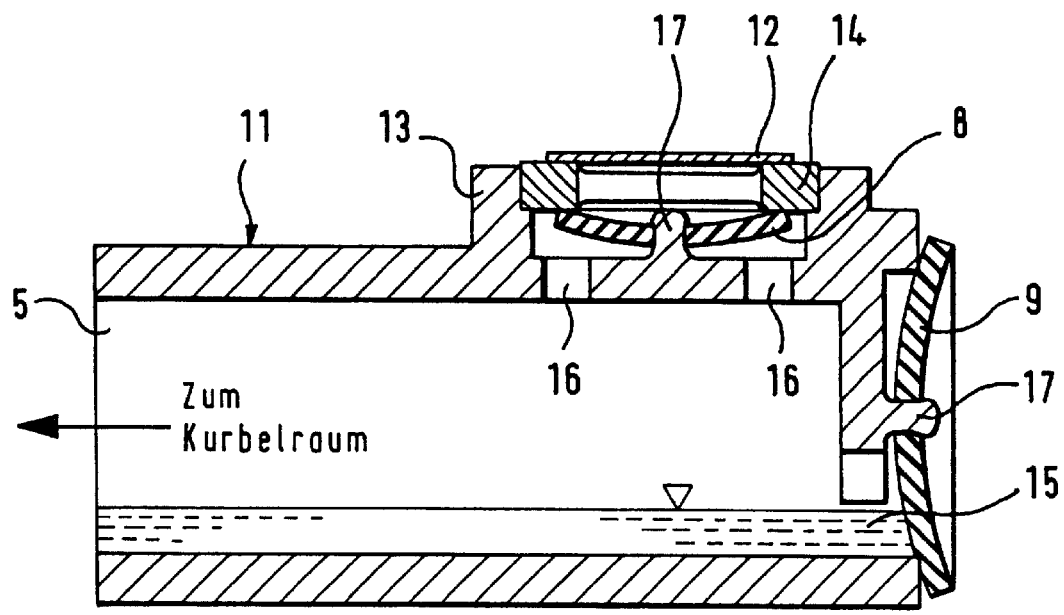
FIG. 2 is a favorable embodiment of the pressure compensation channel in the shape of a pipe member equipped with inlet and outlet valves.

FIG. 2 shows an enlarged view of the embodiment of the pressure compensation channel 5 of the present invention which has previously been illustrated by way of FIG. 1. According to the present invention, the pressure compensation channel 5 includes inlet and outlet valves 8, 9 which are connected to the inlet and outlet channels 16, 15, must be actuated independently and in different closing and opening directions, and remain closed in their basic position. The inlet and outlet valves 8, 9 are chosen so that they can be opened already by a low pressure differential. To be able to integrate the inlet and outlet valves 8, 9 in the area of the pressure compensation channel 5 in conformity with functioning, the said valves are incorporated at pipe member 11 so that this pipe member 11 carries the inlet and outlet valves 8, 9. Thus, pipe member 11 along with the inlet and outlet valves 8, 9 forms an independently operable subassembly which projects as an extension of the pressure compensation channel 5 from the accommodating member 10 that carries the electric motor 2. The inlet and outlet valves 8, 9 may be designed as diaphragm-type, plate-type, or ball-type non-return valves.

To ensure the smallest possible design, a construction consisting of the diaphragm-type and plate-type design was chosen in the present embodiment which permits an especially favorable response behavior and, simultaneously, a good sealing effect. In terms of construction, the inlet and outlet valves 8, 9 are therefore represented by valve rubbers which are anchored in their center on a peg 17 of the pipe member 11 and, with their outside periphery, respectively form a sealing seat with projections (frame 13) on the pipe member 11. To this end, the inlet valve 8 is arranged on the peripheral surface of the pipe member 11, and the outlet valve 9 is arranged on the end surface of the pipe member 11 remote from the crank chamber 4'. The inlet valve 8 is covered by an element 12 which is permeable to gas, but impermeable to solid particles and fluid. Element 12 is inserted into a frame 13 accommodating the inlet valve 8. Frame 13 blends into a projecting end (pipe member 11). As a result, the inward, curved valve member of the inlet valve 8, in the closed initial position, bears with its outside periphery against an inside end surface of the gas-permeable element 12 that acts as a valve seat 14. The advantage of this disclosed construction is that pump leakage originating from the crank chamber 4' is likely to collect in front of the outlet valve 9, according to the drawing, and thus may initially be stored intermediately because the inlet valve 8 and the element 12 principally act so as to shut off relative to the outside, with the result that the escape of fluid 19 through the outlet valve 9 is prevented until the opening pressure of the outlet valve 9 is reached. Only warming-up, e.g. due to heating of the hydraulic unit caused by the heat of the engine compartment in an automotive vehicle, will achieve the opening pressure at the outlet valve 9 in the pipe member 11 so that both heated air and also leakage fluid can be blown off into the ambient air. To this end the sealing lip of the outlet valve 9 lifts from the frame-shaped end surface of the pipe member 11 and opens the outlet channel 15 in the pipe member 11. Opening of the outlet valve 9 may likewise be effected by the operation of the electric motor 2 because the rotor and the air contained therein will heat up. This causes a low excess pressure in pipe member 11 so that pressure compensation will take place by way of outlet valve 9, irrespective of whether the pipe member 11 is filled with leakage fluid.

As the hydraulic unit cools, a pressure gradient is produced inside the pipe member 11 which causes an enhanced sealing effect of the outlet valve 9 due to the atmospheric pressure that acts on the outside surface of the outlet valve 9. Additionally, the chosen arrangement of the inlet valve 8 produces a suction effect on the inlet valve 8 which causes the sealing lip of the inlet valve 8 to lift from the valve seat 14 at the element 12, with the result that air from the atmosphere flows through the element 12, the inlet valve 8, and the inlet channels 16 in the direction of the pipe member 11 until pressure balance is achieved in the pipe member 11. The exclusively gas-permeable element 12 can be realized, for example, by a Goretex diaphragm or a fine-meshed sieve.

It is thus ensured that the hydraulic unit is submersible, on the one hand, without having to accept compromises with regard to the pressure compensation and the discharge of pump leakage.

Thus, the design of the pressure compensation channel 5 of the present invention principally refers to a fluid pump which is activated by the differential pressure and pumps the leakage fluid of the pump into the ambient air due to differences in pressure which are produced during heating and cooling of the hydraulic unit. Immersion of a heated hydraulic unit into cold water causes the inlet valve 8 to open due to the pressure gradient in the pipe member 11. Air will continue to flow into the pipe member 11 due to the cooling operation until the water level outside the pipe member 11 reaches element 12 that is impermeable to fluid. Thereafter, pressure balance is interrupted, and water cannot enter the pipe member 11 and cannot propagate in the direction of the crank chamber 4'. When the hydraulic unit is above the water level again, the water can drip off element 12 or evaporate, and the exchange of air via the inlet valve 8 is possible again.

Thus, the construction chosen prevents damage due to corrosion or damage caused by short circuiting of electrical components located within the hydraulic unit.

What is claimed is:

1. Hydraulic unit for slip-controlled automotive vehicle brake system, comprising:
    a pump housing containing a pump,
    an electric motor having a drive shaft, wherein said drive shaft is coupled to the pump for driving the pump, wherein the drive shaft of the electric motor communicates with a crank chamber of the pump housing, and
    wherein a pressure compensation channel is connected between the crank chamber and atmosphere by way of inlet and outlet valves, wherein said inlet and outlet valves are closed in their basic position and responsive to the pressure differential between atmosphere and the crank chamber.

2. Hydraulic unit as claimed in claim 1, wherein the pressure compensation channel extends at least in part through a pipe member which accommodates the inlet and outlet valves.

3. Hydraulic unit as claimed in claim 2, wherein the pipe member along with the inlet and outlet valves forms an independently operable subassembly which, as an extension of the pressure compensation channel, projects from an accommodating member that carries an electric motor.

4. Hydraulic unit as claimed in claim 1, wherein the inlet and outlet valves are configured as plate-type or ball-type non-return valves.

5. Hydraulic unit as claimed in claim 2, wherein the inlet valve is arranged on a peripheral surface of the pipe member, and in that the outlet valve is arranged on an end surface of the pipe member remote from the crank chamber.

6. Hydraulic unit as claimed in claim 1, wherein the inlet valve is covered by an element which is permeable to gas, and impermeable to solid particles and fluid, the element being retained on a frame that accommodates the inlet valve.

7. Hydraulic unit as claimed in claim 6, wherein the inlet valve in its closed initial position bears against an end surface of the gas-permeable element wherein said end surface functions as a valve seat.

* * * * *